United States Patent [19]
Simonian

[11] Patent Number: 6,017,013
[45] Date of Patent: Jan. 25, 2000

[54] DAMPED INSTRUMENT KINEMATIC MOUNTS

[75] Inventor: Stepan S. Simonian, Torrance, Calif.

[73] Assignee: TRW Inc., Redondo Beach, Calif.

[21] Appl. No.: 08/928,199

[22] Filed: Sep. 12, 1997

[51] Int. Cl.⁷ .................................................. F16M 13/00
[52] U.S. Cl. ........................................ 248/632; 248/638
[58] Field of Search ................................. 248/603, 615, 248/632, 634, 638, 659, 160, 274.1, 276.1; 403/221, 225, 223; 267/140.11, 136, 140.5, 141

[56] References Cited

U.S. PATENT DOCUMENTS

| | | | |
|---|---|---|---|
| 2,796,920 | 6/1957 | Cowles | 248/632 X |
| 2,881,995 | 4/1959 | Neher | 248/632 X |
| 3,329,453 | 7/1967 | Patton | 403/221 |
| 4,572,471 | 2/1986 | Schrepfer | 248/638 X |
| 4,807,841 | 2/1989 | Edstrom | 248/160 X |
| 4,971,285 | 11/1990 | Bechu | 248/634 |
| 5,065,555 | 11/1991 | Kobori et al. | 248/638 X |
| 5,366,200 | 11/1994 | Scura | 248/638 X |
| 5,676,356 | 10/1997 | Ekonen et al. | 248/634 X |

Primary Examiner—Derek J. Berger
Attorney, Agent, or Firm—Michael S. Yatsko

[57] ABSTRACT

A damped instrument kinematic mount providing novel damping features to protect instruments from damaging flight loads. The mounting scheme utilizes any number of identical strut elements to greatly reduce manufacturing complexity and costs. Improved kinematic mount performance is achieved by arranging the six strut configuration to approximately uncouple the mount suspension modes. A spherical joint damper is located at strut flexure locations and utilizes a viscoelastic damping material that deforms in shear. Alternatively, cylindrical slot mount dampers are placed at strut flexure locations. The cylindrical slot mount dampers use o-rings or washers placed within the slotted machined mount bar stock. The kinematic mounts can then be arranged in a classical truss arrangement pattern or other configuration providing desired damping characteristics.

14 Claims, 3 Drawing Sheets

DAMPED INSTRUMENT KINEMATIC MOUNTS

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

Spacecraft structures require the use of advanced lightweight and stiff composite materials in their design to meet the projected weight efficiencies of some current and most future space missions. Unfortunately, these lightweight composites, unlike bolted metallic structures, have very little inherent damping or vibration dissipation characteristics. Thus, due to their light weight and low damping, many structural subsystems with their instruments and electronic payloads, may be subjected to dangerously high vibration levels which compromise their functionality. Of particular interest here are instruments mounted on precision kinematic mounts (KM). Due to their construction techniques, these KM's have very little inherent damping, thus accentuating instrument vibration environment during flight. These environmental effects are brought about during powered flight and pyrotechnic separation/release events. In fact, 14% of spacecraft launches through 1984 (600 launches) suffered vibration/shock related failures. Of these failures, 50% resulted in catastrophic mission loss.

Currently, there are on-going efforts to define graphite structure modifications which lower the overall level of vibration response throughout spacecraft structures. Test and analysis results from a number of space projects using constructions of lightweight graphite composites indicate that the level of reduction likely to be achieved may not be sufficient to bring already developed instruments within their design levels. The need thus arises to identify and make ready for development additional vibration reduction techniques for instruments should the spacecraft structure reduction be proven to be insufficient. In FIG. 1, the instrument 10 is represented by a rectangular solid depicted by broken lines. The instrument 10 is supported by six small precision ground flat pads 12, 14, 16, 18, 20, 22 which only resist loads perpendicular to their plane (individually, they cannot resist bending moments). Under gravity, the three pads 12, 14, 16 support the weight of the instrument 10, i.e., they provide restraint in the z direction. In addition, they restrain the instrument 10 against rotations along the x and y axes. Pads 18, 20 restrain the instrument 10 against translation along the y axis and rotation along the z axis. Finally, pad 22 restrains it against translation along the x axis.

In practice however, it is very difficult to design a linear system of supports which will only provide restraints against translations and none in rotation (i.e. bending action). Conventional designs of three kinematic mounts are depicted in FIGS. 2A–2C. The three mounts are denoted by 24, 30 and 36 in FIGS. 2A–2C, respectively. They comprise a collection of bars 30, 32, 34, 38, 40, 42, 44 attached together. The mount 24 (FIG. 2A) is designed to restrain the instrument predominantly in the axial direction along the longitudinal axis of bar 30, as shown by the arrow 25. At the top and bottom of bar 30, notches 26, 28 have been machined to simulate hinge action, and thus minimize restrains against lateral translations and rotations along three axes. In like manner, mounts 30 (FIG. 2B) and 36 (FIG. 2C) are designed to provide translation restraints predominantly in two and three directions as shown by arrows 31 and 37, respectively. Instruments have been mounted to spacecraft via conventional arrangements of mounts 24, 30 and 36. For a given instrument, particular performance requirements are formulated that specify the maximum values of stiffness the extra restraints can have, which are in excess of the six required for an ideal kinematic mount.

Kinematic mounts, such as those shown in FIG. 2 have met with limited success. Even though these mounts are designed to safely carry the launch loads, the designs have no provisions to minimize loads transmitted to the instrument 10. In particular, the six suspension modes introduced by the mounts are expected to have very little damping, thus amplifying flight loads to the mounted instrument 10.

BRIEF SUMMARY OF THE INVENTION

It is an object of the present invention to provide kinematic mounts which incorporate novel damping features. It is another object of the present invention to provide a kinematic mount having a passive energy dissipating mechanism to protect the instrument from potentially damaging flight loads.

It is a corollary object of the present invention to provide a kinematic mount that may be incorporated on existing KM structures.

It is a further object of the present invention to provide a kinematic mounting scheme which uses six identical strut elements in order to greatly reduce manufacturing complexity and costs.

It is another object to the present invention to slightly rearrange the six strut configuration in order to approximately uncouple the mount suspension modes, thus further improving KM performance.

It is yet another object of the present invention to provide kinematic mounts that achieve modal vibration tests on coupon sample mounts that yield modal damping values from 5–17% of critical damping, which are at least one to two orders of magnitude greater damping than existing designs.

These and other objects are achieved by a damped instrument kinematic mount comprising instrument support means with first and second damping means wherein the damping means and instrument support means are arranged to provide the desired performance characteristics. The device, due to its generic nature can be applied to a large number of precision or optical instruments/sensors where alignment stability is important.

DETAILED DESCRIPTION OF THE INVENTION

Kinematic mounts are used extensively as base supports for precision optical instruments and other high performance machinery. For space based applications, these mounts must fulfill two major requirements: 1) it must not adversely affect the stability of the instrument through the attachment to a less precise spacecraft structure and, 2) it must provide a strong and stable support system to the instrument during launch, and minimize the loads transmitted to the mounted instrument.

The first requirement can be accomplished if the mounting system constrains only the six rigid-body modes of the instrument, without restraining the instrument in any other degree-of-freedom of motion. This is equivalent to a statically determinate mounting system, which in effect will isolate the instrument from unpredictable moment loads due to a non-ideal spacecraft interface and differences in thermal expansion rates.

According to the preferred embodiments of the present inventions, the kinematic mounts have been modified by inserting vibration damping materials into the mounts. These damping materials introduce a damping mechanism into the six mount suspension modes, thus dissipating into heat and reducing the high energy disturbances to the instrument. The modifications to the kinematic mounts preserve the fundamental features, such as strength, stiffness and kinematic features.

The damping mechanism may be provided at machined hinge or flexure locations of the mounts 26, 28, 32, 34, 38, 40, 42, 44. For the above mentioned six mount suspension modes, the most active portion of the mounts will occur at these flexural hinge locations. These relatively active areas can be taken advantage of by designing local dampers at these locations. This can be done in a number of ways, with two embodiments of the damper design depicted in FIGS. 3A and 3B.

Figure 3B:
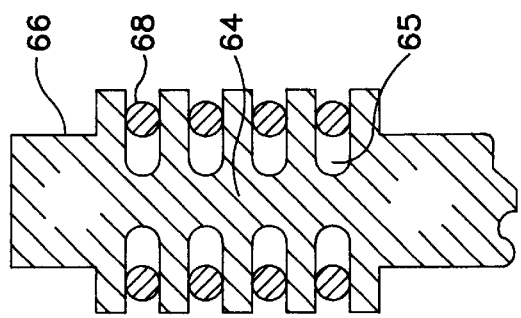
FIGS. 3A–3B depict cross-sections of damper designs according to two preferred embodiments of the present invention.
Figure 3A:
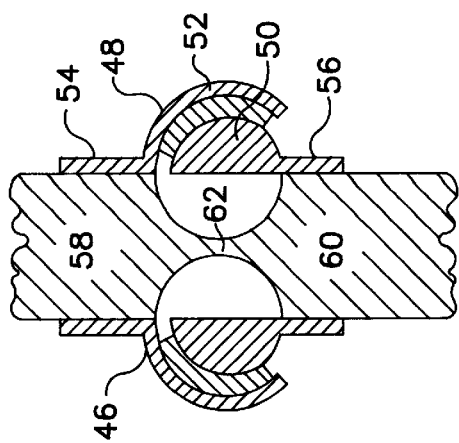

A first embodiment of the damper design is identified in FIG. 3A. This embodiment uses a spherical damper 46 placed around a flexure area 62. The flexure area 62 results from notching 26, 28 of the bar stock 30 used as instrument support means 24. The spherical damper 46 is composed of two partial shells 48, 50 which are concentrically arranged. The first shell 48 is placed partially over the second shell 50. The second shell 50 may be of a solid design. These two partial shells 48, 50 are connected together via a relatively soft layer of viscoelastic (VEM) damping material 52 bonded on one side to the outer surface of shell 50 and bonded on the other side to the inner surface of shell 48. Both partial shells have cylindrical extensions 54, 56 attached rigidly to the bar portion of the mount at locations 58 and 60. As the mount 46 deforms under launch loads, the mount 46 will experience elastic rotations at flexural hinge locations 62 at both ends of the bar 26, 28. Any bending action with center of rotation 62, will activate the spherical damper 46 by forcing the damping viscoelastic layer 52 to deform in shear, thus dissipating vibration energy in the form of heat. By selecting appropriate VEM 52 with the proper shear modulus, material loss factor and thickness, significant levels of damping can be designed into the suspension vibration modes of the kinematic mount 46. In one embodiment, the two partial shells 48, 50 are composed of titanium alloy. In an alternate embodiment, the two partial shells are non-metallic.

At first glance, it might appear that the addition of the damper adds unwanted bending stiffness to the mount 46, and compromises proper kinematic mount action. However, this turns out not to be the case. This is because the VEM properties are frequency (and temperature) dependent in a known manner. At relatively high frequencies, where the suspension modal frequencies occur, the VEM shear modulus is relatively high causing the mount 46 to have higher bending stiffness and thus also dissipate launch loads. However, when on-orbit, where the kinematic mount action is sought for, thermal loads occur at very low loading rates or frequencies. At these low frequencies, which are typically a small fraction of a Hertz, the modulus of the VEM 52 is drastically reduced by at least a factor of 20–30 or more compared to the high frequency range. Thus, the added damper stiffness in the thermal load regime is negligible, when compared to the bending stiffness contributions from the metallic flexural hinges 62. Because of these unique frequency dependent properties of particular space qualified VEM 52, they are viable candidates in damping kinematic mounts during flight.

An alternate embodiment for the damper design is depicted in FIG. 3B. This embodiment uses a cylindrical slot damper 66. The damper 66 uses a series of o-rings 68 placed within a plurality of slots 65. The o-rings 68 are space qualified high damping VEM. The slots 65 are disposed about the resulting flexural hinges 64. Instead of using a single flexural hinge 62, a number of shorter flexures are machined into the mount bar stock 64. The o-rings 68 are subjected to tensile or compressive forces, depending on the vibrational force applied to the instrument 10. Because of their light weight and strength, titanium alloy metals are commonly used to manufacture mounts 66. Whereas the spherical damper discussed above functioned by inducing shearing deformation in the VEM, this design induces compression/tension into the VEM. As far as damping performance is concerned, the damping or loss factor of the material in compression/tension is the same as in shear. It becomes apparent when studying FIG. 3B in more detail, that VEM washers could be used instead of VEM O-rings 68. In each case, we will have slightly different bending stiffness characteristics which can be tailored.

A series of flat washers 68 was modeled and analyzed. The model includes a solid finite element model of a series of four aluminum (aluminum was selected for this exercise since coupons samples will be made using aluminum) flexures each 0.15 inch long and 0.3125 inch diameter, and four VEM washers 0.020 inch thick and 1.3125 inch diameter. The analysis results indicate that for a VEM washer 68, made of ISD 112 material manufactured by the 3M Company, the six suspension modes can be damped by as much as 10% of critical modal damping. A 10% damping is at least an order of magnitude increase in damping over the untreated mount. Thus, the flight induced random vibration response of the instrument 10 due to these suspension modes will roughly drop to a level of the square root of ($\frac{1}{10}$), or 0.32 of the response with the untreated mounts. This is considered a significant performance improvement over the design without the damping treatment, since the instrument is now exposed to only about one third the loads at the high energy mount modes.

Figure 1:
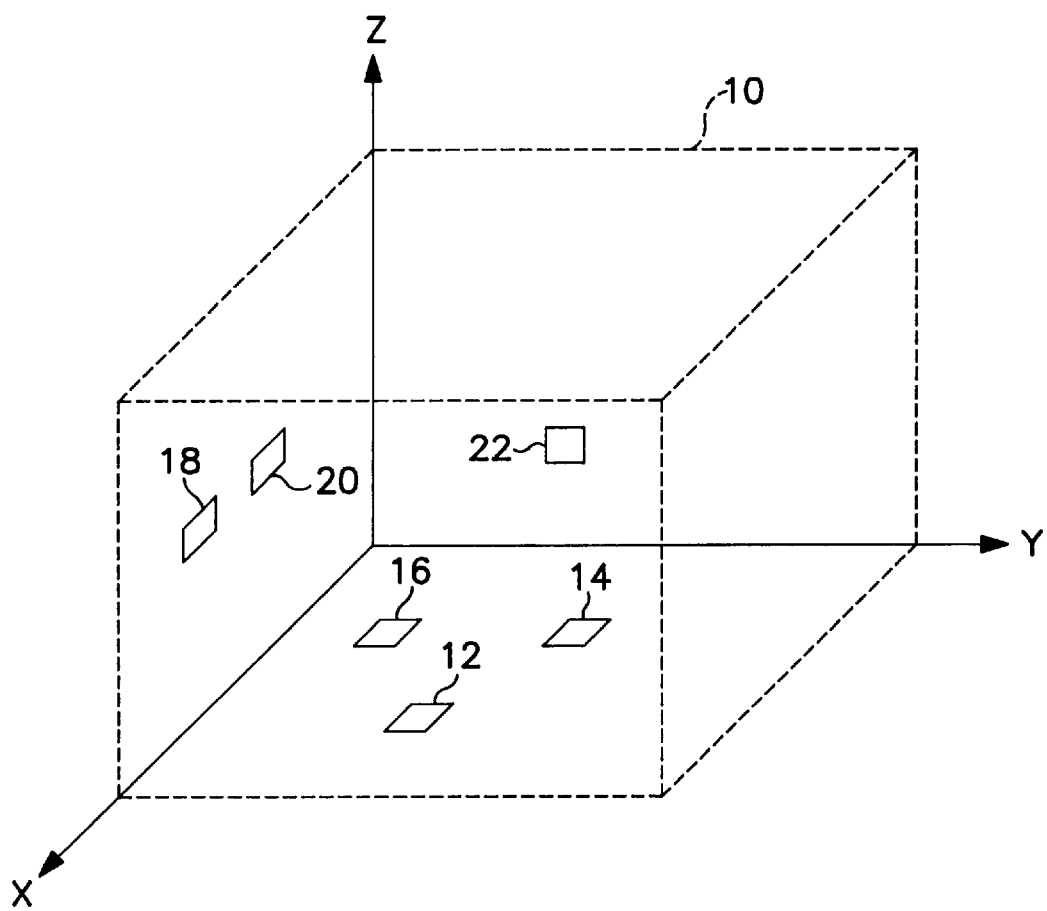
FIG. 1 depicts a conventional example of a kinematic mount arrangement.
Figure 2C:
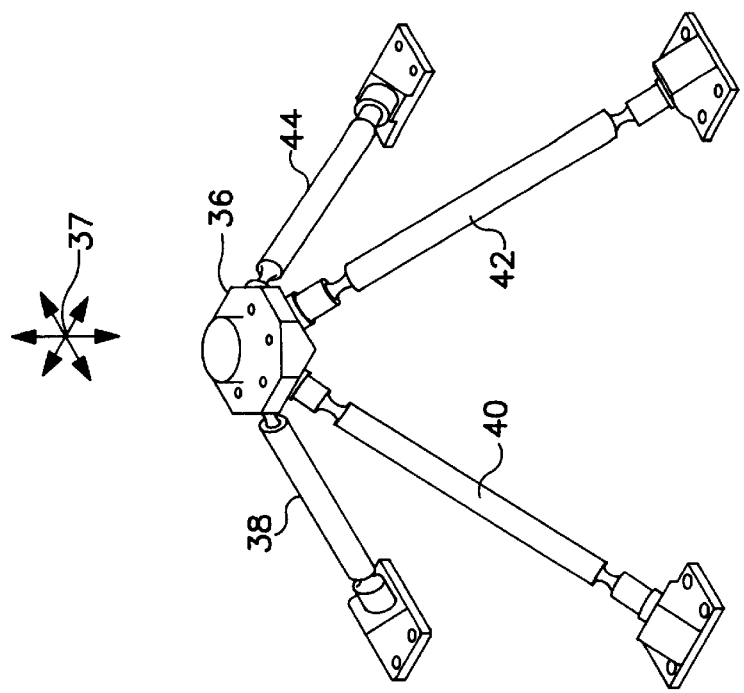
FIGS. 2A–2C depict exemplary designs of conventional kinematic mounts.
Figure 2B:
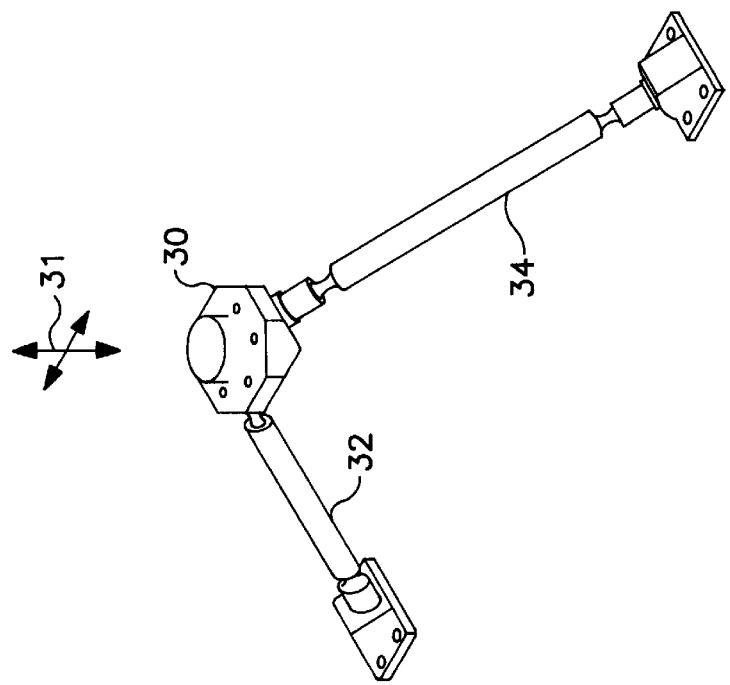
Figure 2A:
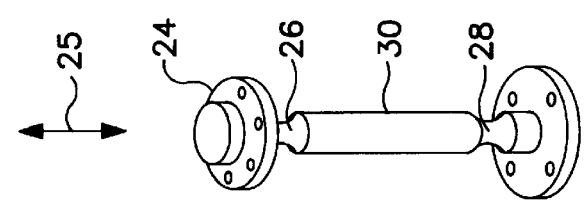
Figure 4:
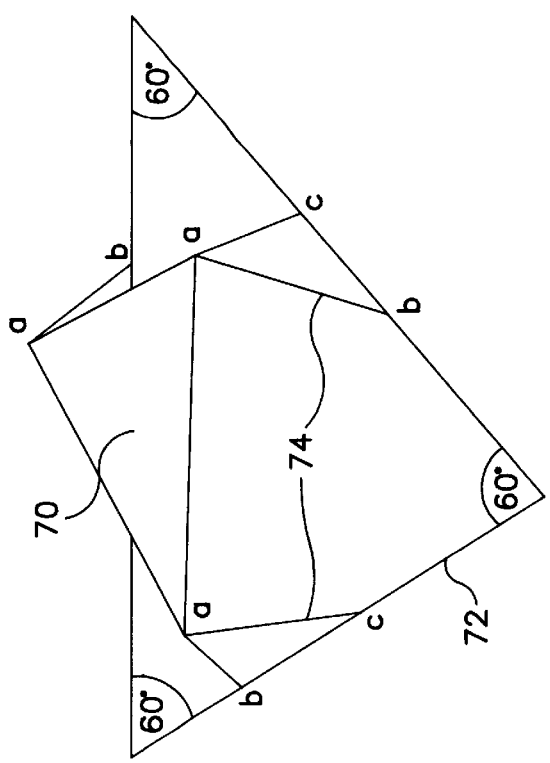
FIG. 4 depicts an exemplary arrangement pattern for kinematic mounts.
Figure 5A:
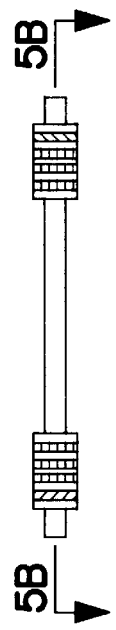
FIG. 5A illustrates a side view of a single strut according to a preferred embodiment of the present invention.
Figure 5B:
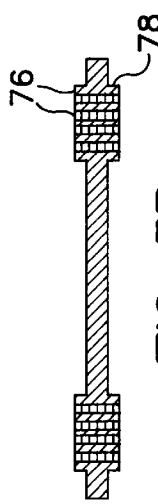
FIG. 5B illustrates a cross-section of a single strut taken along line A—A in FIG. 5A.

In the section above it was mentioned that an infinite arrangement of six restraints exist to obtain kinematic mount (KM) action. Optionally, alternative damped KM design concepts may be used according to the present invention so long as they satisfy the objectives mentioned above. Due to their very efficient stiffness to weight ratios, truss structures may be used. Alternatively, a set of three damped versions of the mount 30 configuration depicted in FIG. 2B may be used to provide a KM system. These can be arranged at the base of the instrument 10 in a variety of configurations. A classical arrangement pattern is shown in FIG. 4. In this figure, each of the six mount truss elements 74 is depicted as line elements for clarity. The damped flexure hinge designs 46, 66 discussed in the previous section (FIGS. 3A & 3B), are applicable to the present case equally well. Drawing from the design in FIG. 3B, each of the six struts 74 depicted in FIG. 4 may take the form shown in FIG. 5A. The embodiment of FIGS. 5A and 5B may use only a single strut design, since all six bars 74 may be identical to one another. This is a significant design simplification since often each of the mount elements 30 and 36 may be machined monolithically from blocks of metal. In contrast, the design depicted in FIGS. 5A and 5B involves only simple machining of standard bar stock. In a preferred embodiment, the standard bar stock may be a titanium alloy.

In addition to the simple design of the mount concept described above, there are other benefits and desirable features of the proposed mounting concept. Rather than using the classical "v" configuration as shown in FIG. 4, each pair of struts 30 can be arranged in such a manner that their axial lines-of-action intersect at selected points within the instrument 10. If these three line-of-action intersection points are selected to be in the same horizontal plane as the instrument center-of-mass, then the six suspension vibration modes of the instrument 10 become approximately uncoupled. This mounting scheme constitutes a center-of-gravity mounting system, in addition to being a KM. To obtain a set of six nearly uncoupled modes is often important in applications where dynamic disturbances are inherent within the instrument. For instance, if the instrument has rotating parts which induce lateral imbalance forces near mount frequencies and passing through its center-of-mass, then the instrument with uncoupled modes will only move laterally, without rotationally disturbing the instruments' line-of-sight. Clearly, not all instruments may require this type of performance, however, if they do, the proposed mounting scheme provides this capability.

From the foregoing description it will therefore be appreciated that the present invention enables the use of damped kinematic mounts to protect instruments from potentially damaging flight loads. While the invention has been described with reference to various illustrative embodiments, it will generally be understood by those skilled in the art that various changes may be made and equivalents be substituted for elements thereof without departing from the true spirit and scope of the invention.

What is claimed is:

1. A damped instrument kinematic mount comprising:
    an instrument support means comprising a first flexural hinge integrally formed at one end thereof and a second flexural hinge integrally formed at a second end thereof;
    a first damping means disposed about the first integral flexural hinge;
    a second damping means disposed about the second integral flexural hinge; wherein the first and second damping means are partial spherical dampers comprising an outer partial spherical shell concentrically arranged over an inner partial spherical shell, the outer and inner shells are secured to a relatively soft layer of viscoelastic damping material, and wherein the outer and inner shells have cylindrical extensions that connect to the instrument support means.

2. The damped instrument kinematic mount of claim 1, wherein the instrument support means comprises a single strut.

3. The damped instrument kinematic mount of claim 2, wherein the single strut is constructed of a titanium alloy.

4. The damped instrument kinematic mount of claim 1, wherein the instrument support means comprises a pair of struts disposed opposite to each other.

5. The damped instrument kinematic mount of claim 4, wherein the pair of struts is constructed of a titanium alloy.

6. The damped instrument kinematic mount of claim 1, wherein the instrument support means comprises two pairs of struts, wherein each pair of struts is disposed opposite to each other.

7. The damped instrument kinematic mount of claim 6, wherein the two pairs of struts are constructed of a titanium alloy.

8. The damped instrument kinematic mount of claim 1, wherein the partial spherical shells are constructed of titanium.

9. The damped instrument kinematic mount of claim 1 wherein the instrument support means comprises three pairs of struts wherein each strut is identical to the others and wherein each pair of struts is disposed relative to the other two pairs of struts to define an isosceles triangle instrument support base.

10. The damped instrument kinematic mount of claim 1 wherein the instrument support means comprises three pairs of struts wherein each strut is identical to the others and wherein each pair of struts is disposed relative to the other two pairs of struts to provide a predetermined axial line-of-action.

11. The damped instrument kinematic mount of claim 10, wherein the predetermined axial line-of-action is in a predetermined horizontal plane.

12. A damped instrument kinematic mount comprising:
    an instrument support means comprising a first flexural hinge integrally formed at one end thereof and a second flexural hinge integrally formed at a second end thereof;
    a first damping means disposed about the first integral flexural hinge;
    a second damping means disposed about the second integral flexural hinge; wherein the first and second damping means are cylindrical slot mount dampers comprising a plurality of o-rings placed within a plurality of annular slots disposed within the first and second integral flexural hinges.

13. The damped instrument kinematic mount of claim 2, wherein the plurality of o-rings are constructed of a high damping viscoelastic material.

14. The damped instrument kinematic mount of claim 10, wherein the plurality of o-rings are constructed of a metallic alloy.

* * * * *